US007178710B2

(12) United States Patent
Jiang et al.

(10) Patent No.: US 7,178,710 B2
(45) **Date of Patent: *Feb. 20, 2007**

(54) BRAZING TITANIUM TO STAINLESS STEEL USING NICKEL FILLER MATERIAL

(75) Inventors: Guangqiang Jiang, Santa Clarita, CA (US); Atilla Antalfy, Castaic, CA (US)

(73) Assignee: Alfred E. Mann Foundation for Scientific Research, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/357,280

(22) Filed: Feb. 16, 2006

(65) Prior Publication Data

US 2006/0138202 A1 Jun. 29, 2006

Related U.S. Application Data

(62) Division of application No. 10/793,536, filed on Mar. 3, 2004.

(51) Int. Cl.
*B23K 31/02* (2006.01)
*A47J 36/02* (2006.01)

(52) U.S. Cl. .................................... 228/124.6; 228/101

(58) Field of Classification Search ..................... None
See application file for complete search history.

(56) References Cited

U.S. PATENT DOCUMENTS 5,190,831 A * 3/1993 Banker ....................... 428/660
5,314,106 A * 5/1994 Ambroziak et al. ..... 228/114.5
6,875,949 B2 * 4/2005 Hall ...................... 219/121.64
2006/0113357 A1 * 6/2006 Jiang et al. ................. 228/101

* cited by examiner

*Primary Examiner*—Lynne R. Edmondson
(74) *Attorney, Agent, or Firm*—Gary D. Schnittgrund

(57) ABSTRACT

A method of braze bonding a stainless steel part to a titanium part by heating a component assembly comprised of the titanium part, the stainless steel part, and a very thin substantially pure nickel foil filler material placed between the two parts and heated at a temperature that is greater than the temperature of the eutectic formed between the titanium part and the substantially pure nickel filler material, but that is less than the melting point of either the filler material, the stainless steel part, or the titanium part. The component assembly is held in intimate contact at temperature in a non-reactive atmosphere for a sufficient time to develop a hermetic and strong bond between the stainless steel part and the titanium part. The bonded component assembly is optionally treated with acid to remove any residual free nickel and nickel salts, to assure a biocompatible component assembly for implantation in living tissue.

21 Claims, 1 Drawing Sheet

10
4
8
2
6
10

BRAZING TITANIUM TO STAINLESS STEEL USING NICKEL FILLER MATERIAL

CROSS REFERENCE TO RELATED APPLICATION

The application is a divisional of U.S. patent application Ser. No. 10/793,536, filed on Mar. 3, 2004.

DETAILED DESCRIPTION OF THE PREFERRED EMBODIMENT

Figure 1:
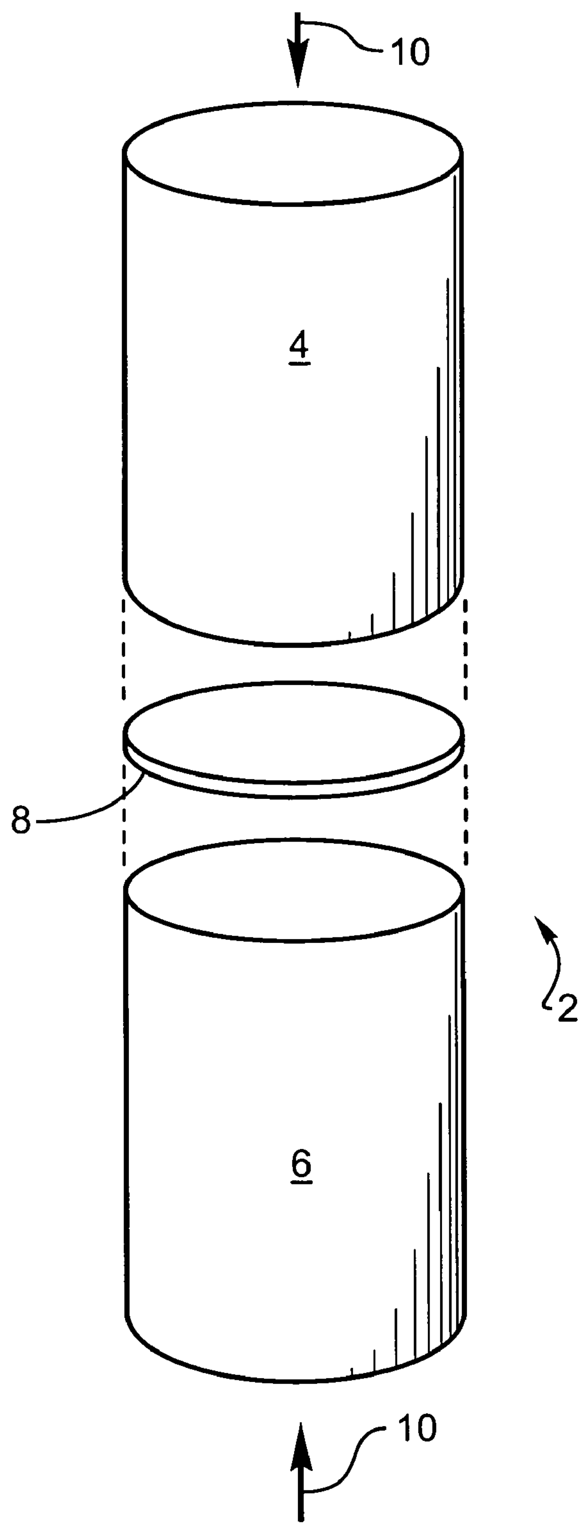
FIG. 1 illustrates the side view of the component assembly with the filler material as a foil between the stainless steel and titanium parts.

FIG. 1 shows component assembly 2 having titanium part 4, stainless steel part 6, and filler material 8. Component assembly 2 is heated to a specific process temperature that is below the melting point of titanium part 4 or of stainless steel part 6, for a specific period of time, at a pressure that is created by force 10 and that is exerted to place filler material 8 in intimate contact with the titanium and stainless steel parts.

Filler material 8 is a foil preferably having a thickness of less than ten-thousandths (0.010) of an inch and more preferably approximately 0.001 inches. Filler material 8 is selected from the group of materials that are compatible with the stainless steel chosen for stainless steel part 6 in that they wet the surface during the bonding process and enter into a diffusion process with the stainless steel part 6 thereby creating a strong bond during processing. Filler material 8 is selected from the group of materials that are compatible with the titanium part 4. Filler material 8 forms a bond with a titanium part 4 by virtue of developing a eutectic alloy at the bonding temperature and pressure utilized during processing. The eutectic alloy formed during processing is predominantly composed of the titanium from titanium part 4. The group of filler materials includes substantially pure nickel, i.e., pure nickel and nickel containing approximately two percent or less by weight of alloy metals. In a preferred embodiment, filler material 8 is preferably commercially pure nickel foil having at least 99.0% nickel and less than 1.0% of other elements with a thickness of approximately 0.001 inches.

Titanium part 4 may be a biocompatible material such as a titanium alloy, and is Ti-6Al-4V in a preferred embodiment. Stainless steel part 6 may be a 200, 300, or 400 series stainless steel, and in a preferred embodiment stainless steel part 6 is 316 stainless steel. In alternative embodiments, rather than using filler material 8 as a foil, filler material 8 may be a thin coating that is applied to either the titanium part 4 or stainless steel part 6 surface to be bonded by any of a variety of chemical processes such as electroless plating and electroplating, or by any of a variety of thermal processes such as sputtering, evaporating, or ion beam enhanced deposition. Filler material 8 may also be applied as a thin coating of metallic beads or metallic powder.

Figure 2:
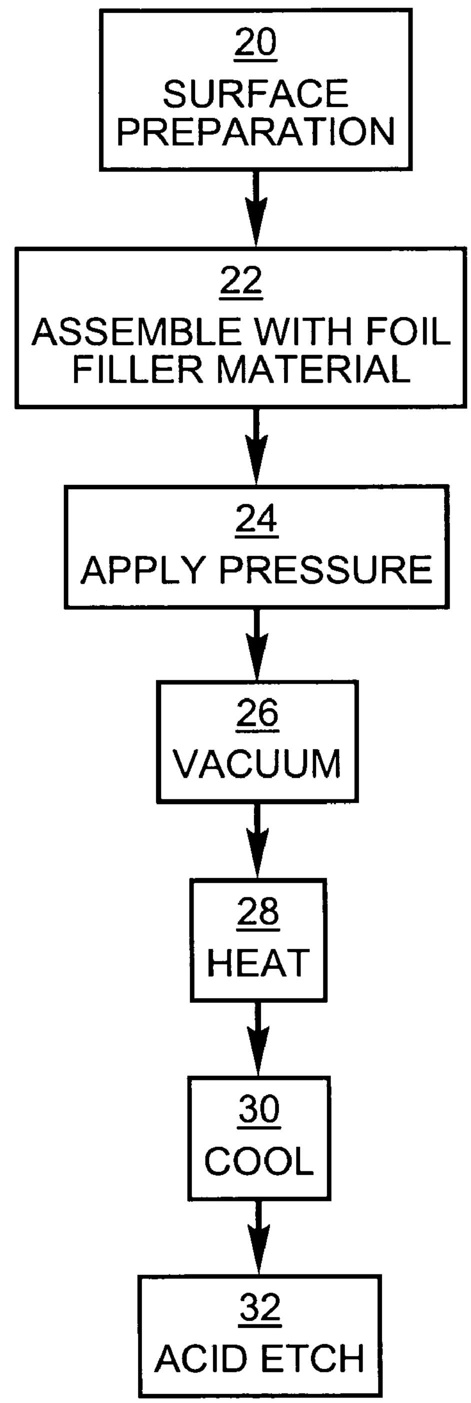
FIG. 2 schematically depicts the bonding steps of the present invention.

The process steps that are employed to create assembly 2 with a strong bond between titanium part 4 and stainless steel part 6 are schematically represented in FIG. 2. First, the surfaces to be bonded are prepared in step 20 by machining to assure that they will intimately conform to each other during bonding. The surfaces are smoothed and cleaned.

In step 22, component assembly 2 is prepared with filler material 8 between titanium part 4 and stainless steel part 6. In step 24, force 10 is applied to compress filler material 8 between titanium part 4 and stainless steel part 6. Force 10 is sufficient to create intimate contact between the parts. Force 10 is applied to assure that a strong and hermetic bond is formed between titanium part 4 and stainless steel part 6.

In step 26 the assembly to be heat processed is placed in a furnace in a non-reactive atmosphere, which is preferably vacuum, but which, in an alternative embodiment, can be any of several atmospheres that are known to one skilled in the art, such as argon or nitrogen. A vacuum is applied before the furnace is heated to the processing temperature in step 28. A preliminary holding temperature, which is lower than the process temperature, may be utilized to allow the thermal mass of the parts to achieve equilibrium before proceeding with heating. The process temperature is lower than the melting point of titanium part 4, but greater than the temperature of the eutectic formed between titanium 4 and filler material 8. In a preferred embodiment, the vacuum is $10^{-5}$ to $10^{-7}$ torr, to assure that the filler material 8 and titanium part 4 do not oxidize. Component assembly 2 is held at the selected temperature, which is between approximately 940° and 1260° C., for approximately 5 to 10 minutes, while force 10 continues to be exerted on filler material 8. The exact time, temperature and pressure are variable with each other so as to achieve a hermetic and strong bond of titanium part 4 with stainless steel part 6. For example, in a preferred embodiment, a 316 stainless steel part is bonded to a Ti-6Al-4V part in vacuum at $10^{-6}$ torr at approximately 1000° C. for 10 minutes with a pressure of about 5 to 20 psi on a commercially pure nickel foil of approximately 0.001 inches thickness.

The furnace is cooled and component assembly 2 is cooled to room temperature in step 30. In optional step 32, component assembly 2 is cleaned by being placed in a bath, after thermal processing is complete, to assure removal of all nickel and nickel salts. This bath is preferably an acid bath that etches the exposed surfaces of component assembly 2. In a preferred embodiment, the bath is nitric acid. Removal of nickel and nickel salts in the bath etch insures that component assembly 2 is biocompatible. Nickel and nickel salts are detrimental to living animal tissue. In the preferred embodiment, however, all of the nickel that is introduced as filler material 8 is combined with the titanium and is chemically tied up by thermal processing to be unavailable as free nickel or as a nickel salt.

Component assembly 2 is biocompatible after bonding and processing. Titanium part 4, stainless steel part 6, and filler material 8 are selected so as to be compatible with the environment in a living body. Hence, titanium part 4 is preferably a Ti-6Al-4V alloy and stainless steel part 6 is preferably a 316 stainless steel.

In a preferred embodiment, component assembly 2 is either an electrical sensor or an electrical stimulator that is implanted in a human body, although it could equally well be implanted in any animal. It must survive long periods in the hostile environment of a living body, which is basically a warm saline solution. In a preferred embodiment, component assembly 2 is either a sensor or stimulator comprised of a hollow stainless steel tube that contains various electronic components that is bonded to a titanium electrode end. The component assembly must be watertight; hence, the bond is hermetic, resisting salt-water intrusion as well as growth of living tissue into the titanium-to-stainless steel bond joint.

Further, component assembly 2 does not corrode while implanted in the body. The materials are chosen such that they are not susceptible to corrosion either individually or in the as-bonded state. Component assembly 2 resists electrolytic corrosion as well as crevice corrosion, because of the materials selected for component assembly 2.

Obviously, many modifications and variations of the present invention are possible in light of the above teachings. It is therefore to be understood that, within the scope of the appended claims, the invention may be practiced otherwise than as specifically described.

What is claimed is:

1. A method of hermetically sealing a stainless steel and titanium component assembly for implantation in living tissue, comprising the steps of:

selecting a stainless steel part;

selecting a titanium part;

selecting a substantially pure nickel filler that is compatible with said stainless steel part, said substantially pure nickel filler being one which forms a eutectic alloy with said titanium part, said eutectic alloy consisting of metals of said titanium part and said substantially pure nickel filler and having a eutectic melting point that is lower than the respective melting point of said titanium or of said substantially pure nickel filler;

positioning said substantially pure nickel filler between said stainless steel part and said titanium part;

applying a force to said stainless steel part and said titanium part to place said substantially pure nickel filler in compression, thereby creating intimate contact between said stainless steel part, said titanium part and said substantially pure nickel filler;

placing the assembly in a non-reactive atmosphere;

heating the assembly to a bonding temperature between said eutectic melting point and said melting point of said titanium part;

holding the assembly at said bonding temperature for a predetermined time to form a bond between said stainless steel part and said titanium part; and cooling the assembly.

2. The method of claim 1 wherein said force creates compression between 2 and 500 psi.

3. The method of claim 1 wherein said force creates compression between 2 and 7 psi.

4. The method of claim 1 wherein said stainless steel part is selected from the group consisting of 200, 300, and 400 series stainless steel.

5. The method of claim 1 wherein said titanium part is selected from the group consisting of titanium and its alloys.

6. The method of claim 1 wherein said titanium part is comprised of Ti-6Al-4V.

7. The method of claim 1 wherein said substantially pure nickel filler is comprised of pure nickel.

8. The method of claim 1 wherein said substantially pure nickel filler is comprised of about 0.010 inches or less thick foil.

9. The method of claim 1 wherein said substantially pure nickel filler is applied chemically.

10. The method of claim 1 wherein said substantially pure nickel filler is applied thermally.

11. The method of claim 1 wherein said substantially pure nickel filler is in the form of metallic beads.

12. The method of claim 1 wherein said substantially pure nickel filler is in the form of metallic powder.

13. The method of claim 1 wherein said non-reactive atmosphere is a vacuum between approximately $10^{-5}$ to $10^{-7}$ torr.

14. The method of claim 1 wherein said non-reactive atmosphere is an argon or nitrogen gas.

15. The method of claim 1 wherein said bonding temperature is between approximately 940° and 1260° C.

16. The method of claim 1 wherein said predetermined time is between approximately 1 and 60 minutes.

17. The method of claim 1 additionally comprising the step of cleaning said component assembly after bonding to remove toxic materials that are harmful to living tissue.

18. The method of claim 17 additionally comprising the step of cleaning said component assembly after bonding by placing it in an acid bath.

19. The method of claim 17 wherein said toxic materials are comprised of nickel and nickel salts.

20. A method of bonding a Ti-6Al-4V metal part to a stainless steel part making a hermetically sealed component assembly for implantation in living tissue, comprising the steps of:

selecting a stainless steel part from the group consisting of biocompatible and corrosion resistant stainless steels;

positioning a substantially pure nickel filler between said stainless steel part and said Ti-6Al-4V metal part;

applying a force to said stainless steel part and said titanium part so as to place said substantially pure nickel filler in compression;

placing said component assembly in a non-reactive atmosphere;

heating said component assembly to between approximately 940° and 1260° C. for between approximately 1 and 60 minutes; and cooling said component assembly.

21. A method of bonding a stainless steel part to a titanium part to form a component assembly for placement in living tissue in which a filler is placed between the two parts to be bonded, applying a compressive force of 2 to 500 psi to said stainless steel part and said titanium part so as to place said filler in compression to form intimate contact between said stainless steel part, said titanium part and said filler, said filler being a metal which forms a eutectic alloy with said titanium part, said eutectic alloy consisting of metals comprising said titanium part and said filler and having a eutectic temperature that is lower than the melting point of said titanium or of said filler, and in which said component assembly, comprising said stainless steel part, said titanium part and said filler, is placed at a bonding temperature, for a predetermined time, that is less than the melting point of said titanium part, said stainless steel part or said filler, but where said bonding temperature is greater than the melting point temperature of said eutectic alloy, selecting said stainless steel part from the group consisting 200, 300, and 400 series stainless steel, selecting said titanium part from the group consisting of titanium and titanium alloys, wherein the improvement comprises:

selecting said filler to be substantially pure nickel; and selecting said bonding temperature between approximately 940° and 1260° C.

* * * * *